(12) United States Patent
Leiber et al.

(10) Patent No.: US 11,901,770 B2
(45) Date of Patent: Feb. 13, 2024

(54) EXTERNAL STATOR FOR A ROTATING FIELD MACHINE WITH AN INTERNAL ROTOR, WITH STATOR TOOTH GROUPS, EACH OF WHICH HAVING TWO ADJACENT STATOR TEETH

(71) Applicant: LSP Innovative Automotive Systems GmbH, Unterföhring (DE)

(72) Inventors: Thomas Leiber, Rogoznica (HR); Jochen Keller, Munich (DE)

(73) Assignee: LSP INNOVATIVE AUTOMOTIVE SYSTEMS GMBH, Unterfoehring (DE)

( * ) Notice: Subject to any disclaimer, the term of this patent is extended or adjusted under 35 U.S.C. 154(b) by 604 days.

(21) Appl. No.: 16/967,637

(22) PCT Filed: Jan. 28, 2019

(86) PCT No.: PCT/EP2019/051996
§ 371 (c)(1),
(2) Date: Aug. 5, 2020

(87) PCT Pub. No.: WO2019/154658
PCT Pub. Date: Aug. 15, 2019

(65) Prior Publication Data
US 2021/0281130 A1    Sep. 9, 2021

(30) Foreign Application Priority Data
Feb. 7, 2018   (DE) ............. 10 2018 102 740.0

(51) Int. Cl.
*H02K 1/20* (2006.01)
*H02K 1/14* (2006.01)
(Continued)

(52) U.S. Cl.
CPC ............ *H02K 1/20* (2013.01); *H02K 1/146* (2013.01); *H02K 1/278* (2013.01); *H02K 1/2791* (2022.01);
(Continued)

(58) Field of Classification Search
CPC .......... H02K 1/02; H02K 1/146; H02K 1/148; H02K 1/185; H02K 1/20; H02K 1/278;
(Continued)

(56) References Cited

U.S. PATENT DOCUMENTS 4,260,926 A * 4/1981 Jarret ............... H02K 19/103
310/185
6,509,665 B1   1/2003 Nishiyama et al.
(Continued)

FOREIGN PATENT DOCUMENTS

| CN | 101415950 A | 4/2009 |
| CN | 101951108 A | 1/2011 |

(Continued)

OTHER PUBLICATIONS

Office Action dated Mar. 1, 2022 in Chinese Application No. 201980012350.0.
(Continued)

*Primary Examiner* — Alex W Mok
(74) *Attorney, Agent, or Firm* — Panitch Schwarze Belisario & Nadel LLP

(57) ABSTRACT

The invention relates to an external stator of a rotating-field machine with internal rotor, which external stator is designed as an internal stator or external stator and which external stator has a number of N stator teeth which together form a number of N/2 tooth groups, and each stator tooth has in each case one pole core and one pole shoe integrally formed thereon, wherein the pole cores are manufactured from a first material, and that in each case one tooth group
(Continued)

Figure 1:
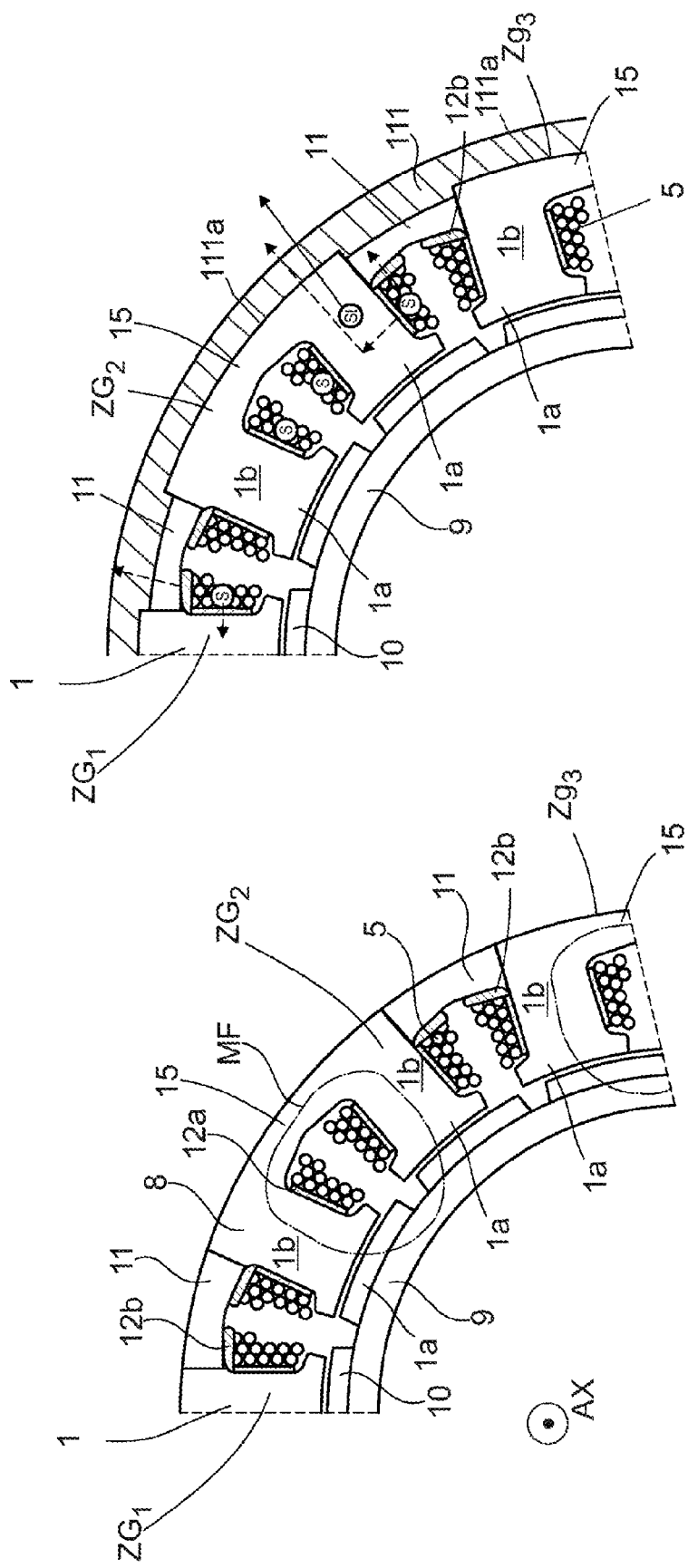

S: Loss source, exciter coil
St: Loss source, stator lamination is formed by two directly adjacently arranged stator teeth which, together with a magnetic return means, are constituent parts of a magnetic circuit, characterized in that, between two adjacent stator teeth of two adjacent tooth groups, there is arranged in each case at least one intermediate element which extends in particular in an axial direction of the stator and which is manufactured from a second material, and in that differs from the first material of the pole cores.

29 Claims, 5 Drawing Sheets

(51) Int. Cl.
| | |
|---|---|
| *H02K 1/27* | (2022.01) |
| *H02K 11/33* | (2016.01) |
| *H02K 21/16* | (2006.01) |
| *H02K 9/20* | (2006.01) |
| *H02K 1/278* | (2022.01) |
| *H02K 9/22* | (2006.01) |
| *H02K 1/2791* | (2022.01) |

(52) U.S. Cl.
CPC ............ *H02K 9/20* (2013.01); *H02K 9/223* (2021.01); *H02K 9/227* (2021.01); *H02K 11/33* (2016.01); *H02K 21/16* (2013.01); *H02K 2213/03* (2013.01)

(58) Field of Classification Search
CPC ...... H02K 1/2786; H02K 11/33; H02K 21/16; H02K 2203/12; H02K 2213/03; H02K 3/345; H02K 5/1735; H02K 9/20; H02K 9/223; H02K 9/227
USPC .......................................................... 310/54
See application file for complete search history.

(56) References Cited

U.S. PATENT DOCUMENTS

| | | | | |
|---|---|---|---|---|
| 7,655,868 | B2* | 2/2010 | Sheaffer | H02K 3/30 |
| | | | | 310/45 |
| 8,097,996 | B1* | 1/2012 | Rao | H02K 3/34 |
| | | | | 310/215 |
| 9,598,141 | B1* | 3/2017 | Doerksen | A62C 27/00 |
| 2004/0021395 | A1 | 2/2004 | Maslov et al. | |
| 2009/0134734 | A1 | 5/2009 | Nashiki | |
| 2011/0037338 | A1 | 2/2011 | Leiber et al. | |
| 2012/0001515 | A1 | 1/2012 | Kudose et al. | |
| 2012/0062051 | A1* | 3/2012 | Ueno | H02K 1/148 |
| | | | | 310/43 |
| 2012/0306206 | A1* | 12/2012 | Agrawal | F04D 25/0606 |
| | | | | 290/52 |
| 2012/0306297 | A1 | 12/2012 | Kim et al. | |
| 2012/0319526 | A1 | 12/2012 | Hagenlocher et al. | |
| 2013/0264896 | A1* | 10/2013 | Morita | C08K 3/22 |
| | | | | 336/90 |
| 2014/0035424 | A1* | 2/2014 | Shibuya | H02K 3/18 |
| | | | | 310/198 |
| 2015/0194846 | A1* | 7/2015 | Putz | H02K 21/145 |
| | | | | 29/598 |
| 2015/0381010 | A1 | 12/2015 | Kobes et al. | |
| 2016/0254719 | A1* | 9/2016 | Pondelek | F16H 57/0476 |
| | | | | 310/54 |
| 2017/0346370 | A1* | 11/2017 | Sentis | H02K 15/0006 |
| 2018/0006521 | A1* | 1/2018 | Fujimoto | H02K 5/225 |

FOREIGN PATENT DOCUMENTS

| | | | | |
|---|---|---|---|---|
| CN | 102810964 A | 12/2012 | | |
| CN | 103370853 A | 10/2013 | | |
| CN | 103501063 A | 1/2014 | | |
| CN | 104604106 A | 5/2015 | | |
| CN | 104702014 A | 6/2015 | | |
| CN | 105493384 A | 4/2016 | | |
| CN | 105981272 A | 9/2016 | | |
| CN | 107240970 A | 10/2017 | | |
| DE | 2745516 A1 | 4/1979 | | |
| DE | 102008055594 A1 | 7/2009 | | |
| DE | 102009057446 A1 | 6/2011 | | |
| DE | 102012015210 A1 * | 2/2014 | ............ | H02K 1/145 |
| EP | 1513244 A1 | 3/2005 | | |
| EP | 2179488 B1 | 5/2012 | | |
| EP | 2880741 B1 * | 6/2016 | ............ | H02K 1/145 |
| EP | 3133718 A1 * | 2/2017 | ............ | H02K 1/145 |
| JP | 2015527861 A * | 9/2015 | | |
| WO | 2005071817 A1 | 8/2005 | | |
| WO | 2007014674 A1 | 2/2007 | | |
| WO | 2010099974 A2 | 9/2010 | | |
| WO | 2010099975 A2 | 9/2010 | | |
| WO | 2012079761 A2 | 6/2012 | | |
| WO | WO-2014019688 A2 * | 2/2014 | ............ | H02K 1/145 |

OTHER PUBLICATIONS

Search Report dated Jul. 2, 2018 in DE Application No. 10 2018 102 740.0.

Int'l Search Report dated Sep. 26, 2019 in Int'l Application No. PCT/EP2019/051996.

* cited by examiner

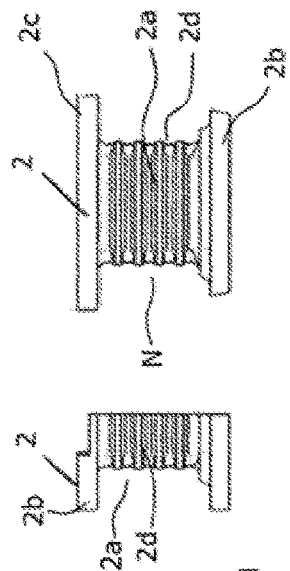
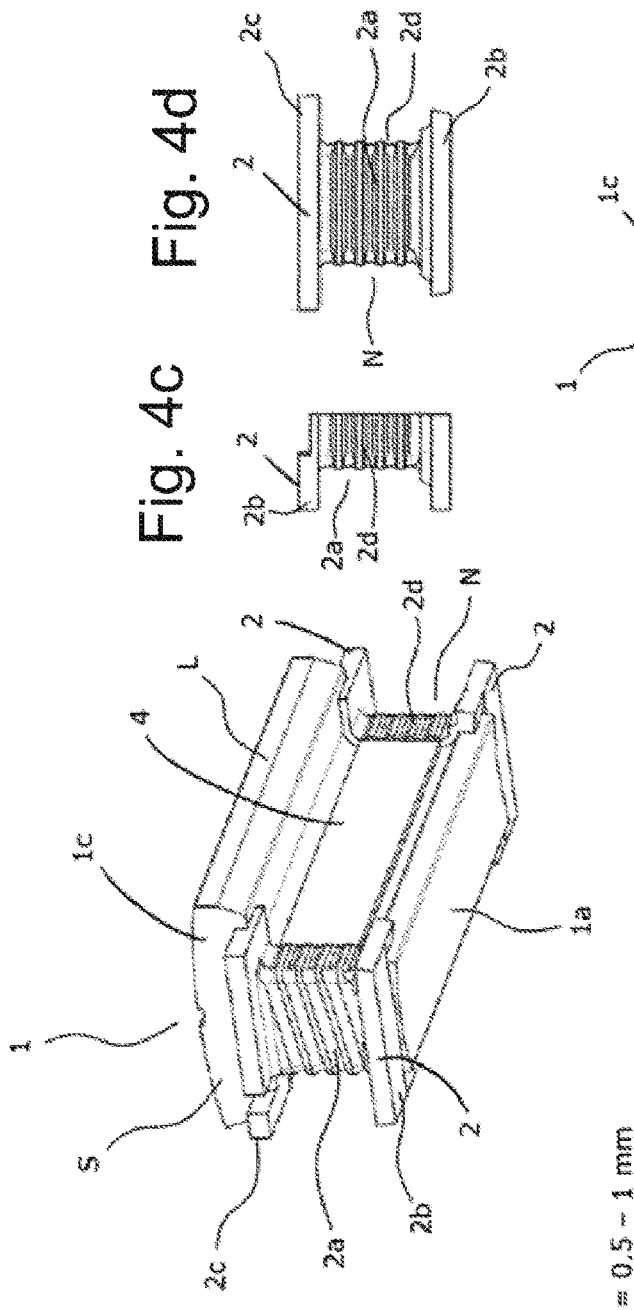

EXTERNAL STATOR FOR A ROTATING FIELD MACHINE WITH AN INTERNAL ROTOR, WITH STATOR TOOTH GROUPS, EACH OF WHICH HAVING TWO ADJACENT STATOR TEETH

CROSS-REFERENCE TO RELATED APPLICATION

This application is a Section 371 of International Application No. PCT/EP2019/051996, filed Jan. 28, 2019, which was published in the German language on Aug. 15, 2019 under International Publication No. WO 2019/154658 A1, which claims priority under 35 U.S.C. § 119(b) to German Patent Application No. 10 2018 102 740.0, filed Feb. 7, 2018, the disclosures of which are incorporated herein by reference.

The present invention relates to an external stator of a rotating-field machine with an internal rotor and with a number of N stator teeth which together form a number of N/2 tooth groups, and each stator tooth has in each case one pole core and one pole shoe integrally formed thereon, wherein the pole cores are manufactured from a first material, and that in each case one tooth group is formed by two directly adjacently arranged stator teeth which, together with a magnetic return means, are constituent parts of a magnetic circuit.

PRIOR ART

Known rotating-field machines or electric motors are generally designed as permanently excited internal-rotor or external-rotor motors. These are increasingly used as electrical drive motors of two-wheeled vehicles, passenger motor vehicles, heavy goods vehicles, and in propeller-driven drive systems in the maritime sector and in aviation. In particular in the case of vehicles, ships and also more recently electric aircraft which are driven using batteries or lithium-ion batteries, efficiency is the primary design parameter, because the efficiency primarily determines the size of the battery and thus the overall costs. It is however also necessary for the costs of the electric motor to be taken into account in the overall consideration, for which reason cost-efficient use of a wide variety of materials is necessary and relevant. In the aviation sector, in particular in the case of electrically driven aircraft, not only the efficiency but also the power density must be taken into account, for which reason the use of permanent magnets is generally preferred.

In order to achieve high efficiency and power density, various measures for reducing losses are implemented in addition to the use of permanent magnets. A distinction is made between copper losses in the coils, the iron losses in all iron-containing motor components relevant to the magnetic circuit, and the friction losses in the bearings.

In order to reduce copper losses, the single-tooth technique and winding of single teeth or double teeth are favored. With the single-tooth winding technique, the exciter coil can be wound in a precise manner, whereby the copper filling level in electric motors is increased. In the case of external rotors, aside from the single-tooth technique, use is also made of a winding technique with a flexural stator, as described in EP 2179488 B1.

In order to reduce iron losses, use is made of laminated stators with a small lamination thickness, in particular Si—Fe laminations with lamination thicknesses <=0.3 mm, and laminated rotors and optionally, in order to reduce the eddy current losses, also fragmented permanent magnets.

Furthermore, use is increasingly made of materials with high temperature resistance, in particular permanent magnets with high remanence and at the same time high coercivity field strength $H_{CJ}$. This high temperature resistance leads to very high costs, because, for example, such permanent magnets have a high dysprosium fraction. Furthermore, stator laminations with very low losses (lamination thickness 0.1-0.2 mm) or high degree of saturation (for example cobalt-iron laminations) are very expensive.

For example, in WO 2010/099974, a double rotor with a highly complex water-type cooling arrangement is realized. The cooling channels are realized in an injection molding process using thermosetting plastic, and run between the exciter coils from the housing to the winding head, and are diverted at the winding head. Such cooling is extremely expensive and furthermore not optimal, because winding space for copper coils is lost.

Another approach for heat conduction is realized in WO2010/099975. In the case of this double-rotor motor, the stator is encapsulated by injection molding with a thermosetting plastic material with good heat conductivity characteristics. At the same time, in the selection of the thermosetting plastic material, importance must be attached to stiffness, because the encapsulation of the stator by injection molding substantially contributes to the stability of the cantilevered stator during operation. Furthermore, it is disclosed in WO2010/099975 that, by means of the potting and the good heat conductivity characteristics of the thermosetting material, the heat transfer from the winding head of the exciter coils to the housing can be improved.

The solution disclosed in WO2010/099975 however has certain weaknesses. Firstly, in the case of injection molding using thermosetting plastic, consideration must be given primarily to the strength, and it is thus not possible, in the selection of the material, to attach importance exclusively to the heat conductivity characteristics. Furthermore, with a material with simultaneously high strength and high heat conductivity, the method is very expensive, because the entire stator obtains its final stability and heat conductivity for the first time in the injection molding process involving thermosetting plastic. The stator teeth must be fixed in a very solid manner during the injection molding process because high injection pressures are used in the case of injection molding involving thermosetting plastic. Furthermore, a high level of material use with very expensive fillers (heat conductors, for example boron nitride, strength-improving materials, such as for example carbon fibers or glass fibers) is necessary. Finally, the concept of the double-rotor motor, owing to the principle, allows heat conduction only in one direction.

Common methods of optimizing the insulator of the stator tooth are the use of stator tooth end pieces composed of plastic and the insulation of the central region by means of a thin Kapton film with acceptable conductance (0.12-0.3 W/mK) and sufficient dielectric strength >2 kV. Owing to the thin-walled nature of the Kapton film, it is however possible for more heat to be transferred via this heat path. Owing to the thin film, the heat path from the exciter coil to the stator is reduced, and the copper filling ratio is increased, because the thin-walled Kapton film allows more space for the copper coils in the winding window. This insulation technique is however used primarily to improve the copper filling ratio of the electric motors. It does not result in improved cooling performance, because the coil normally does not bear against the Kapton film and thus a certain air gap is situated between the hot coil and the heat-dissipating Kapton film and the exciter coil, which arises owing to the lack of precision in the winding technique.

OBJECT OF THE INVENTION

It is an object of the invention, in the context of increasing the continuous power of rotating-field machines with an internal rotor, to improve the heat dissipation from the windings via the stator tooth or external stator and reduce the weight of the external stator.

Said object is achieved according to the invention by means of an external stator as per the preamble of claim 1 in that, between two adjacent stator teeth of two adjacent tooth groups, there is arranged in each case at least one intermediate element which extends in particular in an axial direction of the stator and which is manufactured from a second material, and in that differs from the first material of the pole cores.

The invention thus discloses for the first time a stator which has N/2 tooth groups which are spaced apart and connected by means of intermediate elements, whereby the weight of the stator is reduced. Furthermore, the performance of the motor is preferably improved through efficient heat dissipation inter alia via the intermediate elements between the tooth groups, and thus the continuous power is considerably increased.

In this way, it is advantageously possible for regions of the external stator which have no or minor importance for the magnetic flux to be utilized for heat conduction or for weight reduction through the use, in these regions, of materials which have good heat conductivity characteristics and/or a lower density than the material of the pole cores. Alternatively or in addition, it is possible, for example, for a fluid-type cooling arrangement or heatpipes to be arranged in these regions.

The tooth groups each form, by way of their two stator teeth, U-shaped yokes with in each case at least one, preferably two, exciter coil(s) per tooth group. For the connection of the tooth groups or the U-shaped yokes, use is made in each case of the intermediate elements which are manufactured from a second material which has a density $\rho 2$ which is smaller, at least by a factor of two, than the density $\rho 1$ of the first material from which the pole cores are manufactured. With the intermediate element, it is possible for two different optimization directions to be pursued.

In a first optimization direction, it is sought to optimize the power or the maximum torque through improved heat conduction in the stator and a lower weight of the stator. Here, the second material may have a heat conductivity $\lambda 2$ higher than that of iron (80 W/mK) of at least 150 W/mK (for example heat conductance of magnesium), in particular higher than 200 W/mK (heat conductance of aluminum). It is thus advantageously produced from aluminum or magnesium or an alloy of these materials.

Owing to the maximum limit of the operation of particular materials, such as for example copper coils, with a typical maximum temperature of 180° C., the maximum continuous power of an electric motor is limited by the temperature of the heat sink and by the temperature difference in the exciter coil. If the thermal conductance between coil and heat sink is halved, this leads to an increase in power by approximately a factor of 1.5-2. The efficient dissipation of heat is therefore of such particular importance.

A further optimization can be achieved through axial heat conduction by virtue of the heat being conducted not only radially to the housing but also axially to at least one end side of the electric motor. In order to optimize this heat conduction, the use of water-type cooling arrangements or heatpipes is expedient. It is thus possible, by means of water-type cooling arrangements or heatpipes, to further improve the axial heat conduction by a factor of 10 (water) to over a factor of 100 (heatpipes). This axial heat conduction is highly important also in the case of internal-rotor motors in certain applications if a long housing which projects beyond the stator is used for the purposes of cooling.

In a second optimization direction, the focus is placed on minimizing weight. In this case, the second material has a density $\rho 2$ which is smaller, at least by a factor of three, preferably by a factor of 5, than the density $\rho 1$ of the first material, and/or has a heat conductivity $\lambda > 5$ W/mK. Corresponding materials would be aluminum oxide ceramics, aluminum nitride ceramics or silicon carbide or boron nitride. Also, the second material may be a non-ferromagnetic material. It is thus possible, as second material, to use a lightweight material, for example plastic, for the purposes of optimizing the weight of the stator.

The two stator teeth of a tooth group are in this case connected via the magnetic return means in order to form the magnetic circuit. Here, the magnetic return means is formed integrally on the ends, averted from the pole shoe, of the pole cores of the stator teeth belonging to one tooth group. The two stator teeth and the magnetic return means thus form a U-shaped yoke.

For all possible embodiments described, it is the case that, in and/or on the intermediate element, there may be arranged at least one heat-conducting means, in particular in the form of a water channel of a water-type cooling arrangement or heatpipe, which heat-conducting means extends in an axial direction of the stator and serves inter alia for the dissipation of heat in an axial direction. Here, said heat-conducting means may be provided in each or else only in some intermediate elements.

For the radial dissipation of heat from the exciter coil, in the case of an internal rotor radially outward to the heat-dissipating intermediate element, an in particular plate-like cooling body which extends in an axial direction of the stator and which has a heat conductivity of greater than 1 W/mK, preferably greater than 2 W/mK, may be provided, which is arranged between exciter coil and stator tooth.

The intermediate elements serve for the mechanical connection of the tooth groups. Here, the intermediate elements may for example be adhesively bonded or welded to the tooth groups. It is however likewise possible for the intermediate elements to be connected to one another by means of positive locking, for example corresponding tongue-and-groove connections, or for the intermediate elements 11 or the U-shaped yokes to be anchored in a tubular housing part. The U-shaped yokes or the intermediate elements may be placed into the housing tube and/or pushed axially into the housing tube.

If the space between the windings in the winding grooves is potted with an additional potting compound, this should advantageously have a heat conductivity of at least 0.25 W/mK, and there should no longer be any air inclusions between the coil wires of the windings. In this way, the heat dissipation in particular between the coil layers of the exciter coils is significantly improved.

Adjacent stator teeth may bear differently wound exciter coils in order to optimize the copper filling ratio, wherein the coils are in particular geometrically shaped such that said coils do not make contact with one another as they are pushed onto the stator teeth and/or in the state in which they have been pushed onto the stator teeth. In order to realize this, the pole shoes are separated from the pole core and, after the exciter coils have been pushed on, are mounted onto the pole core and are connected to the core by means of positive locking or an adhesive connection. An adhesive connection is sufficient if the stator is potted after being enwound, and the potting additionally fixes the pole shoe.

Preferably, neighbouring coils of a tooth group are, for the purposes of optimizing the copper filling ratio, formed with different geometrical shapes, for example wedge-shaped versus parallel winding forms, or as exciter coils with n layers and (n+x) layers. Here, the coils are, in accordance with the winding form, pushed successively onto the one stator without pole shoes, wherein, firstly, the exciter coils with (n+x) layers are pushed onto every second stator tooth 1b, and then the exciter coils with (n) layers are pushed onto every second adjacent yoke tooth, such that the exciter coils do not make contact during the pushing-on process. Furthermore, the stator tooth 1b is already provided with an insulator prior to the pushing-on process, as illustrated and described in FIGS. 4 to 7. Thus, each tooth group $ZG_i$ has in each case two teeth with in each case different coils with n and n+x layers respectively. In order to prevent compensation currents, these coils are furthermore preferably connected electrically in series with one another.

The above embodiments with optimized radial and axial stator cooling can be used particularly effectively in the optimization of an internal-rotor motor with integrated electronics, wherein cooling of the winding head of the exciter coils is also an expedient addition.

The winding head cooling is realized by virtue of the exciter coils being arranged only with a small spacing to a heat conductor, preferably being potted in this region and pressed against a highly conductive insulator (for example boron nitride). Additionally, heat is dissipated axially into the heat conductor via the intermediate elements of the stator. The internal-rotor motor is thus cooled via multiple parallel paths with very good heat conduction (radial cooling of the stator, axial cooling via intermediate elements, winding head cooling). It is thus possible for a flow of air or water around the surface of the housing of the internal-rotor motor to be utilized in a particularly effective manner because a very great length is available for the purposes of cooling. Thermally insulated electronics can additionally be integrated axially with the motor, the power semiconductors of which electronics are likewise cooled by means of the air or water flow and are not burdened, or are burdened only to a small extent, by the power losses of the motor.

Through effective use of the cooling and the special configuration of the rotor and of the bearing arrangement thereof, it is possible to realize an internal-rotor motor with a not very high torque density or low torque-to-weight ratio (Nm/kg) and power density (kW/kg).

In all of the embodiments described above, it is possible for the stator to furthermore be designed such that the stator teeth, in particular the pole cores thereof, are entirely or regionally covered or encased by an electrical insulator which serves for electrical insulation of the winding with respect to the stator tooth, wherein the electrical insulator may be of single-part or multi-part form, and at least one part or region of the insulator, or the entire insulator, is formed from a material with a heat conductivity characteristic of greater than 1 W/mK, preferably greater than 2.5 W/mK. Here, the electrical insulator may have two insulating bodies which engage around in each case one end side of the stator tooth and which, in particular at their side facing toward the winding, have channels for the coil wires of the winding. It is likewise possible that at least one, in particular fixed and dimensionally stable heat-conducting element, in particular in the form of a plate, bears against at least one longitudinal side of the pole core and/or of the pole shoe, which heat-conducting element is arranged between two insulating bodies which engage around in each case one end side, in particular in recesses of the insulating bodies, wherein at least one heat-conducting element has a heat conductivity of greater than 5 W/mK, preferably greater than 10 W/mK, particularly preferably greater than 20 W/mK, in particular is manufactured on the basis of ceramic or silicon carbide or from boron nitride composite materials, and/or the heat-conducting element has a heat conductivity which is greater at least by a factor of two, preferably by a factor of five, than that of the insulating bodies. It is also possible for the heat-conducting element to bear directly against a part or the entirety of the side surface of the pole core and/or the pole shoe and to be manufactured from ceramic or on the basis of ceramic and to have both electrically insulating characteristics and a thermal conductivity of >10 W/mK, particularly preferably to be an aluminum oxide or nitride ceramic or to be composed of silicon carbide or boron nitride. Here, it is likewise possible for the electrical insulator or at least one insulating body to be formed by encapsulation of the stator tooth by injection molding, in particular by encapsulation at least of the pole core by injection molding, wherein the potting material is a thermoplastic or a thermosetting plastic, wherein the thermosetting plastic has in particular a heat conductivity of greater than 1 W/mK, preferably greater than 5 W/mK. Here, the electrical insulator (200) formed by encapsulation by injection molding may have at least one window-like aperture or a recess with thin-walled region for receiving at least one heat-conducting element in particular in positively locking fashion, wherein the heat-conducting element is arranged laterally on the pole core, in particular bears against the latter, and has a heat conductivity of greater than 5 W/mK, in particular is manufactured from boron nitride.

In all of the possible embodiments described above, it is advantageous if the magnetic resistance between the pole cores of two stator teeth belonging to one tooth group is lower than that between the pole cores of two adjacent stator teeth belonging to different tooth groups.

Possible embodiments of the stator according to the invention will be discussed in more detail below on the basis of drawings.

Figure 2:
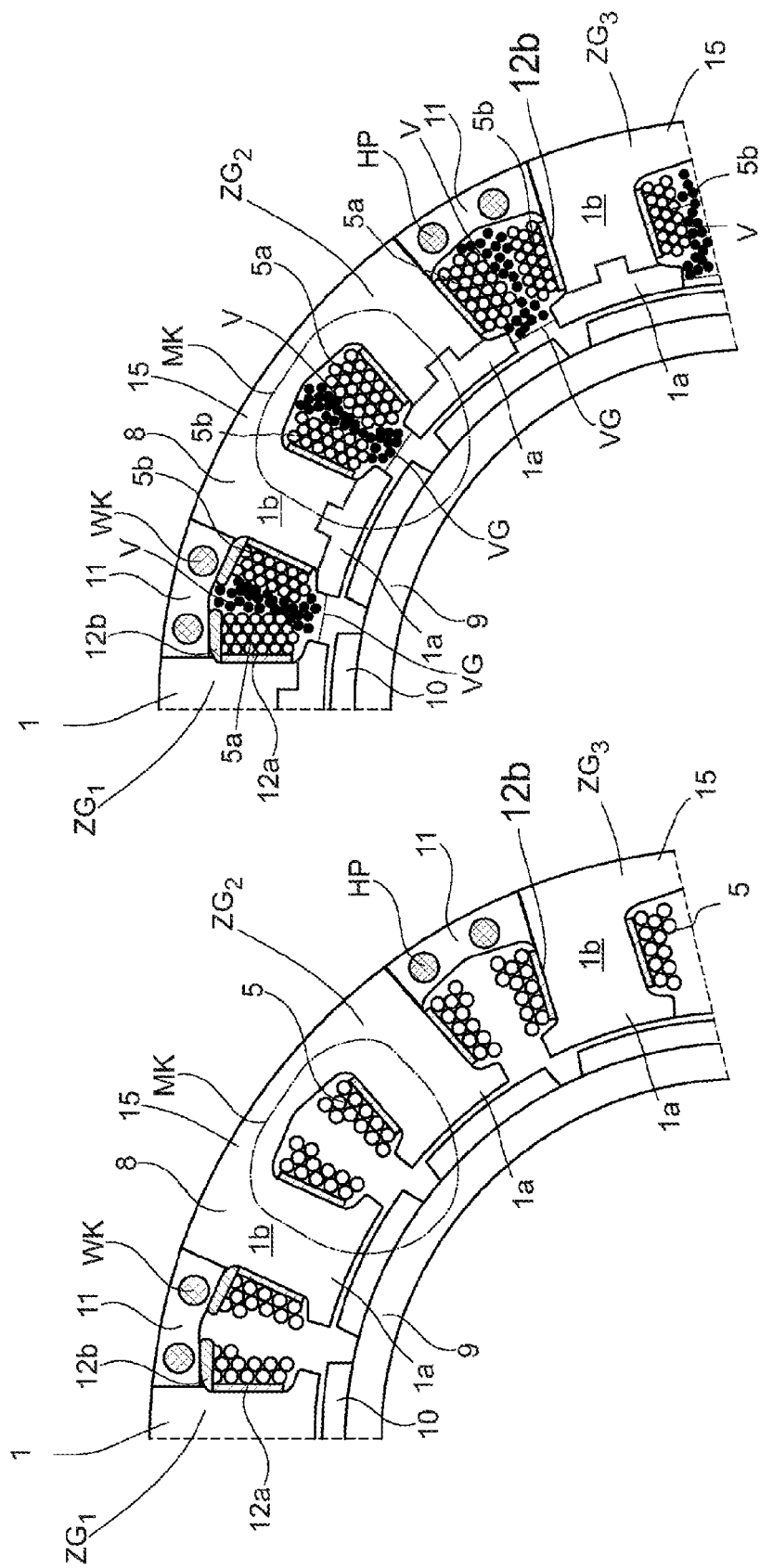
Figure 3:
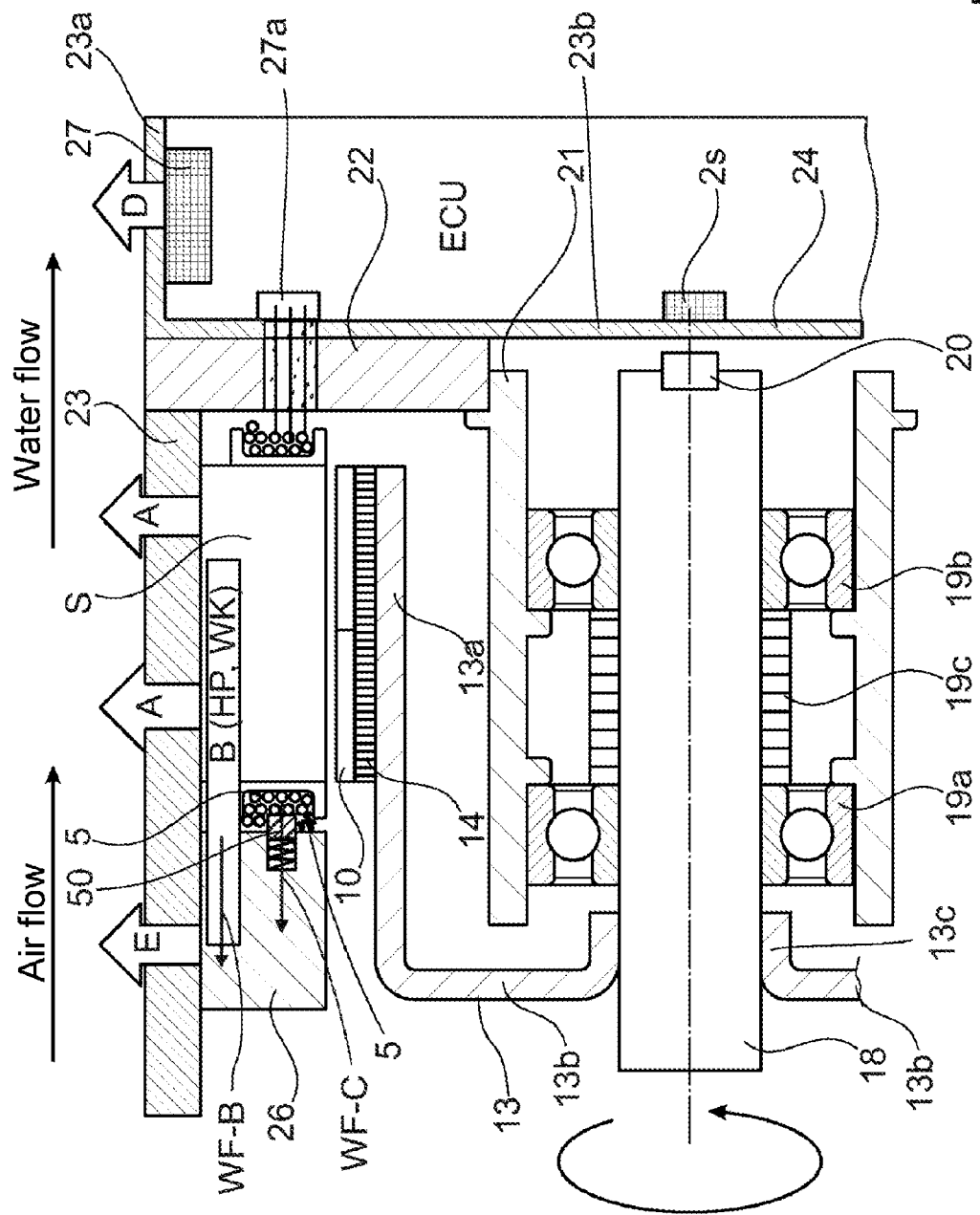
Figure 5:
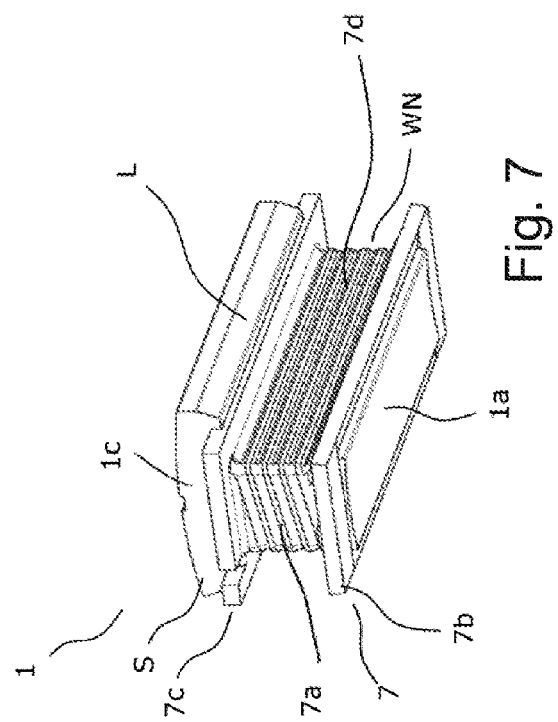
Figure 6:
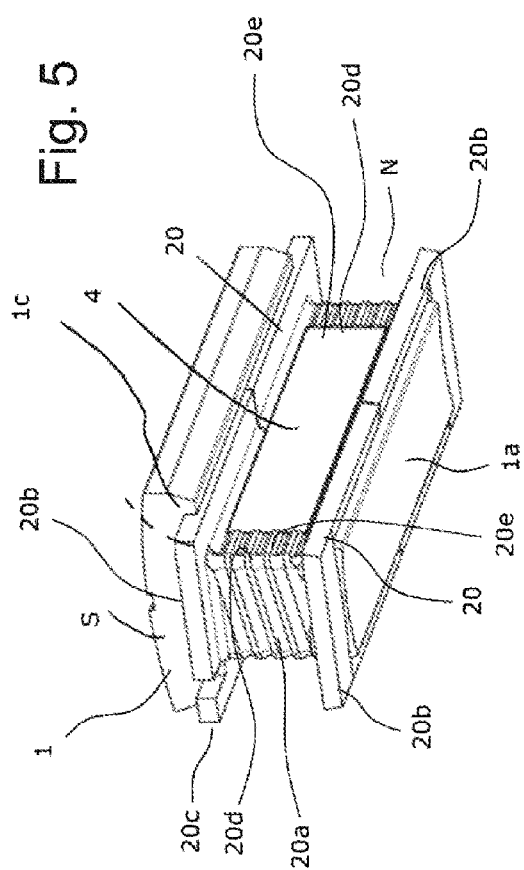
Figure 7:
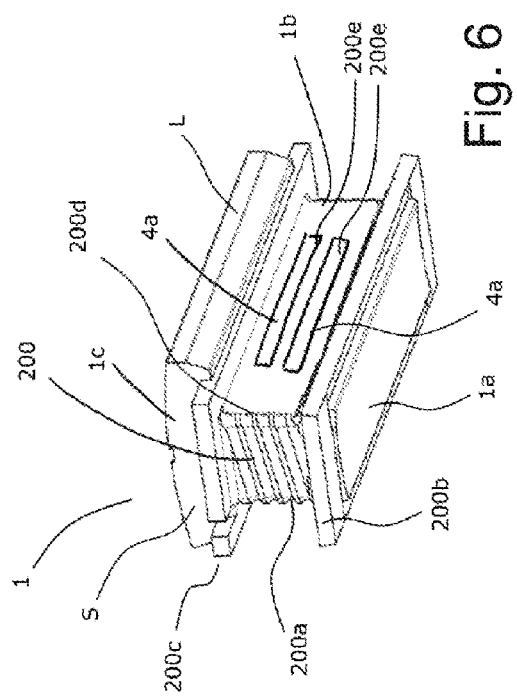

In the drawings:

FIG. 1*a*: shows a part of the cross section through a stator according to the invention of an internal rotor according to one possible embodiment;

FIG. 1*b*: shows the stator as per FIG. 1*a* with housing tube and with a heat dissipation direction indicated;

FIG. 2: shows the stator as per FIG. 1*a* with additional heat-conducting means in the intermediate element;

FIG. 2*a* shows the stator as per FIG. 2 with separated pole shoes and non-uniformly enwound neighbouring coils;

FIG. 3 shows a possible configuration of a rotating-field machine with external stator according to the invention;

FIG. 4*a*: shows a perspective illustration of a stator tooth according to the invention with two end-side insulating bodies and a heat-conducting element arranged axially in between;

FIG. 4*b*: shows a cross-sectional illustration through the stator tooth as per FIG. 2*a* in the region of an insulating body;

FIGS. 4*c* and 4*d*: show side views of the insulating body;

FIG. 4*e*: shows a side view and cross-sectional illustration through a heat-conducting element;

FIG. 5: shows a stator tooth as in FIG. 1*b*, wherein the end-side insulating bodies however cover the entire axial length of the stator tooth with as small a parting gap as possible and together form in each case one window-like recess for receiving a heat-conducting element at at least one pole core longitudinal side;

FIG. 6: shows a stator tooth according to the invention with an insulator formed by encapsulation by injection molding, which insulator forms, at each pole core longitudinal side, two recesses for receiving in each case one heat-conducting element;

FIG. 7: shows a stator tooth according to the invention with an insulator formed by encapsulation by injection molding from a thermosetting plastic with a material with good thermal conductivity.

FIG. 1*a* shows a part of the cross section through a stator (S) according to the invention of an internal rotor according to one possible embodiment, wherein the heat flow directions are indicated by means of arrows in FIG. 1*b*.

FIG. 1*a* shows the special configuration of an external-yoke stator S composed of stator teeth 1, wherein in each case two adjacent stator teeth 1 form in each case one tooth group $ZG_i$. Here, a tooth group ZG is substantially U-shaped in cross section, wherein the individual tooth groups $ZG_i$ are held with a spacing or in position relative to one another, and/or may be or are connected to one another, by means of intermediate elements 11.

The intermediate elements 11 have the task of increasing the cooling power and are thus advantageously composed of a material with good thermal conductance. If the intermediate element 11 is composed of an electrically conductive material, it must also be separately insulated in relation to the coil 5, which may be realized for example by means of the element 12*b*.

By means of the intermediate element 11, it is furthermore possible for the weight to be reduced through the use of a light metal (aluminum, magnesium) or plastic with preferably good heat-conducting characteristics. Also, the heat conduction may occur directly from the coil 5 radially to the intermediate element 11 if the element 12*b* has good thermal conductivity, that is to say a thermal conductivity of at least 1 W/mK, preferably >2.5 W/mK. An advantage of these intermediate elements 11 is that, here, a material can be used which has much more favourable thermal conductance than the stator lamination situated there in the standard case. Further parallel heat paths of the loss sources of the coil (S) and of the stator (ST) are thus realized instead of only from the coil 5 to the stator tooth 1 and from there to the housing of the rotating-field machine. The generally dominant losses of the exciter coil are thus firstly dissipated in a circumferential direction to the heat-conducting intermediate element and are then discharged radially outward from the intermediate element 11. Thus, firstly, the distance to the cooling environment is shortened, and the transfer surface area is significantly enlarged. The radial heat conduction however makes sense only if the intermediate piece is formed from a material with good heat conductivity (for example magnesium or aluminum), because an intermediate element 11 composed of plastic with a heat conductivity characteristic significantly lower than the ferromagnetic tooth does not contribute to the heat conduction.

Here, each stator tooth 1 is composed of the pole core 1*b* and the integrally formed pole shoe 1*a*, wherein the stator teeth 1 of a tooth group $ZG_i$ are connected to one another by the magnetic return means 15. Here, the stator teeth 1 of a tooth group may be formed by U-shaped stator laminations. The coils 5 are electrically insulated from the stator teeth 1 by means of a suitable insulator 2, 12*a*, wherein the insulator 2 or the heat-conducting means 12*a* can serve for the dissipation of heat from the coils in the direction of the stator tooth 1. The insulation and heat conduction will be described and illustrated separately on the basis of FIG. 6 et seq.

The stator teeth 1 and magnetic returns 15 are manufactured from a first, in particular ferromagnetic material MA1. The intermediate elements 11 are manufactured from a second, different material MA2, which is in particular lighter and/or has better conductance than the first material MA1. The stator teeth of a tooth group form, together with their magnetic return element 15, a U-shaped yoke, which forms a part of the magnetic circuit MF.

The internal rotor 9 is, by way of example, equipped with permanent magnets 10.

FIG. 1*b* shows the same stator construction as in FIG. 1*a*, but here, arrows S and ST are shown for the purposes of illustrating the heat dissipation. Also illustrated is a housing tube 111, in the inner side of which the stator is situated. The housing tube 111 preferably has recessed regions 111*a* in which the U-shaped yokes or alternatively the intermediate elements 11 are fixed. The alternative arrangement of the intermediate elements 11 in the housing is not implemented in FIG. 1. This housing configuration with recessed regions 111*a* for the U-shaped yokes 1*a*, 1*b*, 15 or alternatively the intermediate pieces 11 may be used as an installation aid by virtue of the U-shaped yokes firstly being inserted or pushed in axially and the intermediate elements 11 thereafter being pressed in. The installation sequence may also differ.

FIG. 2 shows a construction similar to FIG. 1*a*, with the main difference that either a water-type cooling circuit (WK) or heat-conducting elements or heatpipes (HP) are inserted in the intermediate elements 11. The heatpipes HP may also be formed by molded elements with very good heat conductivity, for example copper or ceramic pins, by means of which the heat-conducting characteristics can be further improved in relation to the non-ferromagnetic basic material of the intermediate elements. The axial heat conduction in particular is optimized by means of said pins, which can be advantageously utilized in the configuration of an internal-rotor motor for the distribution of heat.

Alternatively, use may also be made of a heatpipe in the form of a classic heatpipe with a hermetically encapsulated volume which is filled with a working medium (for example water or ammonia). By means of heatpipes, the heat dissipation can be improved yet further by a factor of more than 100, in particular a factor of 1000, than in the case of solid pins, such as for example copper, being used.

FIG. 2*a* shows a construction similar to FIG. 2, with the main difference that the pole shoes (1*a*) are separate from the stator (1*b*) and the neighbouring coils 5*a* and 5*b* have, for the purposes of optimizing the copper filling ratio, been enwound non-uniformly, for example exciter coils with n layers and (n+x) layers, and the stator has been potted. In FIG. 2*a*, the coils 5*a* are of four-layer form, and the coils 5*b* are of three-layer form. This embodiment is therefore expedient for optimizing the copper filling ratio in that the coils can, in accordance with the winding form, be pushed successively onto the one stator without pole shoes, wherein, firstly, the exciter coils with (n+x) layers or wedge shape are pushed onto every second stator tooth 1*b*, and then the exciter coils with (n) layers are pushed onto every second adjacent yoke tooth, such that no contact is made with the exciter coils during the pushing-on process. Furthermore, the stator tooth 1*b* is already provided with an insulator prior to the pushing-on process, as illustrated and described in FIGS. 4 to 7. Alternatively, the coil may also be wound onto a winding body and pushed with the winding body onto the tooth.

Thus, each tooth group $ZG_i$ has in each case 2 teeth and in each case different coils with n and (n+x) layers respectively. In order to prevent compensation currents, these coils are preferably connected electrically in series with one another. The pole shoes are then connected in positively locking or non-positively locking fashion to the stator only after the winding process or after the coils have been pushed onto the stator tooth. For the connecting technique between pole shoe and pole core, an adhesive bonding process may also be used if the stator has been potted and provides the structure with additional stability owing to the potting. Additionally, the potting V serves for optimizing the heat dissipation, because thus the air inclusions between the coil layers of the exciter coil are filled.

It is self-evidently likewise possible in the embodiments illustrated in FIGS. 2 and 2a to provide the housing tube 111 shown and described in FIG. 1b.

FIG. 3 shows a rotating-field machine with the external stator S according to the invention of one of the previous embodiments of FIG. 2 or 2a. The rotor shaft 18 is mounted by means of the bearings 19a and 19b on the bearing carrier 21, which in turn is supported on the housing 22, 23 of the rotating-field machine. The pot-shaped internal rotor 13 is in turn fastened rotationally conjointly to the rotor shaft 18 and bears the laminated core 14 and the permanent magnets 10. The pot-shaped rotor 13 has a cylindrical wall 13a which is formed integrally on the radially extending base wall 13b, which in turn has a collar 13c by means of which the rotor is connected rotationally conjointly to the shaft 18. This configuration of the rotor 13 and of the bearing carrier 21 gives rise to a cavity between rotor and shaft, and differs from classic internal-rotor motors, where the rotor is connected directly to the shaft. This arrangement is selected in order to minimize weight of the motor and maximize torque density (unit of torque density: Nm/kg). This is possible because, as described in FIG. 2 and FIG. 2a, the heat is dissipated from the motor in a highly effective manner, or the stator has a high copper filling ratio (FIG. 2a), and thus the stator is of very small construction. In this way, the force-generating permanent magnets can also be arranged at a large radius, whereby the torque is maximized for a given external diameter. By means of the combination of heat dissipation and large force action radius, it is thus possible to realize a very high continuous torque, even with the use of little copper.

The external stator S is connected to the housing tube 111, which is not illustrated in FIG. 3, in a highly heat-conducting manner, for example by means of a press-fit connection, and is arranged axially adjacent to a heat-conducting piece 26, which in turn is fastened to the housing 23 and connected to the latter in a highly heat-conducting manner. The heat is conducted radially outward from the stator S via the housing 23 via the heat-conducting path A and from the heat-conducting piece 23b via the heat path E. The heat generated by the exciter coils 5 is furthermore, aside from the radial heat guidance, dissipated axially via the heat paths WF-B (stator cooling) and WF-C (winding head cooling). Here, the heat dissipation in the case of the heat path WF-B takes place via water-type cooling circuit WK arranged in the external stator S and/or via heatpipes HP, as illustrated and described in FIGS. 2 and 2a.

A dissipation of heat additionally occurs via the axial end side of the exciter coils 5 via electrically insulating heat-conducting elements, composed for example of boron nitride or silicon carbide 50, which heat-conducting elements, by suitable means, such as for example springs, thrust bolts, etc., are forced and pressed against the end side of one, several or all exciter coil(s) 5 and are themselves connected to the stator carrier 26 and release the absorbed heat to the latter, wherein these form the heat path WF-C.

The heat path WF-B and WF-C leads axially into a heat-conducting piece 26, wherein the heat path WF-B leads further axially into the heat-conducting piece 26 than the heat path WF-C. The heat of the two heat paths can thus be distributed in an effective manner and a surface, around which flow passes, of the stator housing 23 can be used more effectively for the purposes of cooling.

On the other side of the stator, it is preferably the case that no heat transfer occurs between coil and housing part 22, it rather merely being the case that the phase contacts of a 3-phase or alternatively 6-phase rotating-field machine are led to the electronic ECU. The housing part 22 therefore preferably exhibits poor heat conductivity. This prevents the electronic ECU from being heated by the electric motor. Furthermore, the housing part 22 is configured so as to thermally insulate the housing parts 23 of the motor and housing parts 23a of the ECU. The motor heat thus heats the ECU only slightly.

The housing (23, 23a), which is itself formed for example as a cooling body, may additionally be flowed around by cooling air or water. Arranged directly on the rotating-field machine is the ECU, in the housing of which the sensor 2s which detects the rotational movement of the shaft 18 is also arranged so as to be axially offset with respect to the sensor target 20 and power electronics with power semiconductor 27, phase contact 27a and circuit board 27b. Furthermore, the power semiconductors of the ECU 27 are connected directly to the external inner wall of the ECU housing 23a, such that the heat of the power semiconductors is conducted radially over a short path for the purposes of cooling.

This inventive configuration of the stator and axial ECU arrangement gives rise to multiple radial heat paths A, E (electric motor) and D (ECU) which are offset in parallel, whereby the water-type cooling and/or air-type cooling of the housing attains its maximum effectiveness and, furthermore, the ECU is optimized independently of the motor, because the ECU is subjected to no or little heating influence by the electric motor. It is thus possible, with a small external diameter, to achieve an optimum torque output with a low weight.

Furthermore, the weight of the motor or power pack (electric motor+ECU) can firstly be minimized by means of the lightweight elements in the stator and the cavity between rotor 13 and bearing tube 21, and the continuous power both of the motor and the electronics can be maximized as a result of minimal heating by the motor.

Likewise, the motor can be operated in a wet or damp configuration, or can be exposed to environmental influences, if the coils are additionally potted and the bearings are sealed. Through corresponding configuration of the ECU housing (23a, 23b), the ECU can likewise be protected against environmental influences. A corresponding cover of the ECU with a seal is not shown.

It is also possible for the housing tube 111 to form the housing 23. It is likewise possible in the case of the embodiments described above for the intermediate elements 11 and the housing tube 111 to be formed in one piece, that is to say the intermediate elements 11 are formed integrally on the housing tube 111.

FIG. 4a shows a possible embodiment of a stator tooth 1 according to the invention illustrated in perspective view, which, as in the case of the stator tooth 1 illustrated in FIG. 1, is equipped with insulating bodies 2 on the winding head, but with the difference that the conventionally used insulating film 3, which is typically manufactured from Kapton, has been replaced by a heat-conducting element 4 in the form of a plate. The heat-conducting element 4 has much higher thermal conductivity, and a high electrical dielectric strength. It may be manufactured from a material such as, for example, ceramic or ceramic-based material. it is thus advantageously the case that at least one heat-conducting element 4 is arranged on each longitudinal side L of the pole core 1b, wherein said at least one heat-conducting element bear(s) against the pole core 1b over as large an area as possible, particularly preferably against the entire longitudinal side L of the pole core 1b. The thus significantly increased thermal conductivity in the groove makes it possible to significantly improve the cooling path from the exciter coil 5 to the stator tooth 1.

As can be seen in FIG. 4b, the insulating body 2 bears with its inner side against the pole core 1b over the full area thereof and against regions of the magnetic return of the pole, that is to say of the pole return 1c and of the pole shoe 1a.

Each insulating body has an end-side region 2a which is adjoined, in the region of the transition from the pole core 1b to the pole shoe 1a, by a collar-like portion 2b. In the region of the transition from the pole core 1b to the pole return 1c, a collar-like portion 2c likewise bears against the central region 2a. The insulating body 2 not only bears against the end side 1 of the stator tooth 1 but also engages laterally around said end side and also bears against a short portion of the longitudinal side L of the stator tooth, in particular in the region of the pole core 1b, by way of its region 2d (FIGS. 4c and 4d). The region 2d furthermore has, on its outer surface in the region of the pole core 1b, channels for the guidance of the first layer of the coil wires of the exciter coil. The region of the pole core 1b forms, together with the pole return 1c and the pole shoe 1a, a groove N for receiving the coil wires or the winding.

FIG. 4e shows a possible embodiment of the heat-conducting element 4 according to the invention, which is formed as a rectangular plate with a thickness D. Here, the thickness D should advantageously be configured to be thicker than the thickness of the lateral projections 2d of the insulating parts 2, in order to ensure that the heat-conducting element 4 is in direct contact with the inner layer of the coil wires. The sheet-connecting element 4 is composed of a material with high thermal conductivity (>5 W/mK) and simultaneously has a high electrical insulation capability. It may be manufactured for example from boron nitride.

FIG. 5 shows a further possible optimization possibility for the stator tooth according to the invention illustrated and described in FIGS. 4a-e. Here, in each case one insulating body 2 is arranged on the two winding heads of the stator tooth 1, wherein the insulating body 2, aside from the function of the electrical insulation and of improving the coil winding capability, also forms a holding device for the heat-conducting elements 4 arranged on both sides of the pole core 1b. Here, the heat-conducting element 4 may be the same as in the embodiment as per FIGS. 2a to 2f.

FIG. 6 shows a further possible embodiment of a stator tooth 1 according to the invention, in the case of which the electrical insulator 200 is injection-molded directly onto the stator core 1b. Here, during the process of encapsulation by injection molding, the upper collar 200b and the lower collar 200c and the groove base with channels 200a for improved wire guidance may be formed simultaneously. Furthermore, during the process of encapsulation by injection molding, one or more apertures 200e for heat-conducting elements 4a which can be placed in subsequently are kept free by means of at least one slide. Alternatively, the outer contour 200a may be exposed by machining after the process of encapsulation by injection molding.

FIG. 7 shows a further variant of the stator tooth injection-molded encapsulation, in the case of which the insulating body 7, 7a, 7b, 7c, 7d is injection-molded directly onto the stator core 1b in the process involving thermosetting plastic. The granulate that is used for the encapsulation of the stator by injection molding already comprises the ceramic additives required for optimized heat guidance. A component is thus created which is optimized with regard to mechanical and thermal stability, degree of electrical insulation and heat-conducting action.

In the embodiments of FIGS. 1a, 1b and 2, the insulating heat-conducting elements 4, 4a are fitted between coil and stator along the axial extent of the stator tooth and serve for considerably improved heat transfer between coil and stator over approximately the entire axial length of the stator. In the winding head region or end side S of the stator teeth 1, there are preferably provided wire-guiding and insulating plastics end pieces in the form of insulating bodies 2, 20, which may be mounted or applied by injection molding. Here, the heat-conducting elements 4, 4a may either be positioned in non-positively locking fashion by means of the insulating bodies 2, 20 or may be connected in positively locking fashion to the stator tooth, such that, as far as possible, a very small spacing and adequate stability are realized.

Alternatively, as illustrated and described in FIG. 6, the stator tooth may be encapsulated by injection molding with a standard plastic in an injection molding process involving thermoplastic, and a region along the side surfaces of the pole core 1b may be apertured such that one or more heat-conducting plates 4a or a composite concept with multiple heat-conducting elements can be introduced there in a subsequent step.

Furthermore, as illustrated in FIG. 7, the stator tooth may be completely encapsulated by injection molding, in an injection molding process involving thermosetting plastic, with a heat-conducting material with high specific conductance, for example boron nitride thermosetting plastic material. This is far less complex in terms of process technology than encapsulating the entire stator by injection molding, because the injection mold can be made considerably simpler. Also, it is not necessary here to attach importance to strength-increasing filler materials, it rather being possible to select exclusively a highly heat-conductive and at the same time insulating material.

In all of the embodiments described above, it is expedient for the stator to be potted or impregnated in order to as far as possible completely eliminate air inclusions between the copper wires and at the stator insulator close to the coil, and to thus further optimize the thermal transition between exciter coil and stator. As potting material, use may expediently be made of a material with acceptable heat-conducting characteristics, with a specific conductance of 0.25-1 W/mK. A potting material with moderate heat-conducting characteristics is always even better than air by a factor of 10, because air has a very low specific conductance of only 0.026 W/mK. Through the use of the potting material, the transition between the coil layers on the stator and the insulating foil and between the coil layers, for example first and second coil layer, can thus be considerably improved.

The invention claimed is:

1. An external stator of a rotating-field machine with internal rotor, the external stator including:
   a number, N, N≥2, stator teeth which together form a number, N/2, of tooth groups, wherein each respective stator tooth has one pole core and one pole shoe integrally formed thereon, wherein the one pole core of the respective stator tooth is manufactured from a first material, wherein each respective one of the N/2 tooth groups is formed by two directly adjacently arranged stator teeth which, together with a magnetic return, are constituent parts of a magnetic circuit, and
   at least one intermediate element arranged between two adjacent stator teeth of two adjacent tooth groups, wherein the at least one intermediate element extends in an axial direction of the stator and is manufactured from a second material that differs from the first material, wherein the second material has a density $\rho_2$ which is smaller, at least by a factor of 2, than a density $p_1$ of the first material, and wherein the second material has a heat conductivity $\lambda_2$ of greater than 100 W/mK.

2. The external stator as claimed in claim 1, wherein the second material is composed of aluminum or magnesium or an alloy of aluminum or magnesium.

3. The external stator as claimed in claim 1, wherein the second material has a density $\rho_2$ which is smaller, at least by a factor of 3, than a density $\rho_1$ of the first material and is plastic, and/or wherein the second material has a heat conductivity $\lambda$>5 W/mK and comprises aluminum oxide or nitride ceramic or silicon carbide or boron nitride.

4. The external stator as claimed in claim 1, wherein the magnetic return is formed integrally on ends, facing away from the pole shoes, of the pole cores of the stator teeth belonging to the tooth group.

5. The external stator as claimed in claim 1, further including at least one heat-conducting element arranged between an exciter coil and the respective stator tooth, wherein the at least one heat-conducting element is in contact with the intermediate element.

6. The external stator as claimed in claim 5, wherein the heat-conducting means is configured as a molded piece, such that one or more coil layers of the exciter coils of adjacent teeth are directly in contact with the molded piece or have a small spacing thereto, and a thermal connection exists.

7. The external stator as claimed in claim 6, wherein the heat-conducting means, for radial heat dissipation from the exciter coil outward to the intermediate element, has a heat conductivity of greater than 5 W/mK and is produced from aluminum oxide or nitride ceramic or silicon carbide or boron nitride.

8. The external stator as claimed in claim 1, further including at least one heat conductor arranged in or on the at least one intermediate element, wherein the at least one heat-conductor comprises a water channel of a water-type cooling arrangement or heatpipe, wherein the heat conductor extends in an axial direction of the stator and serves for the dissipation of heat in an axial direction.

9. The external stator as claimed in claim 1, wherein intermediate elements of the at least one intermediate element serve for the mechanical connection of the tooth groups.

10. The external stator as claimed in claim 1, further including a housing tube, wherein the stator is arranged in the housing tube and/or the at least one intermediate element is/are formed integrally on, or is/are connected to, the housing tube.

11. The external stator as claimed in claim 10, wherein the tooth groups lie in apertures and/or the at least one intermediate element lie(s) in apertures of the housing tube.

12. The external stator as claimed in claim 1, further comprising at least one exciter coil comprising coil wire windings arranged in winding grooves formed between adjacent stator teeth and having space between the windings, wherein the space between the windings in the winding grooves is potted with an additional potting compound with a heat conductivity of at least 0.25 W/mK and such that there are substantially no air inclusions between the coil wires of the windings.

13. The external stator as claimed in claim 1, wherein the two stator teeth of a tooth group of the N/2 tooth groups are composed of a ferromagnetic material and, together with the magnetic return, which has a preferred magnetic direction, form a U-shaped yoke.

14. The external stator as claimed in claim 1, wherein adjacent stator teeth bear differently wound coils in order to optimize a copper filling ratio, wherein the coils are geometrically shaped such that said coils do not make contact with one another as they are pushed onto stator teeth and/or after they have been pushed onto stator teeth.

15. The external stator as claimed in claim 1, wherein a stator tooth of the N stator teeth has longitudinal sides and end sides and is entirely or regionally covered or encased by an electrical insulator that serves for electrical insulation of a winding with respect to the stator tooth, wherein the electrical insulator is of single-part or multi-part form, and wherein at least one part or region of the insulator, or the entire insulator, is formed from a material with a heat conductivity characteristic of greater than 1 W/mK.

16. The external stator as claimed in claim 15, wherein the electrical insulator has two insulating bodies that engage around, in each case, one end side, and which, at their side facing toward the winding, have channels for coil wires of the winding.

17. The external stator as claimed in claim 15, further including at least one fixed and dimensionally stable heat-conducting element], in the form of a plate, wherein the at least one heat-conducting element bears against at least one longitudinal side of the pole core and/or the pole shoe of the stator tooth.

18. The external stator as claimed in claim 17, wherein the at least one heat-conducting element is arranged between the two insulating bodies, in recesses of the insulating bodies, wherein the at least one heat-conducting element has a heat conductivity of greater than 5 W/mK, is manufactured on the basis of ceramic or silicon carbide or from boron nitride composite materials, and/or the at least one heat-conducting element has a heat conductivity which is greater at least by a factor of 2 than that of the insulating bodies.

19. The external stator as claimed in claim 17, wherein the at least one heat-conducting element is manufactured from ceramic or on the basis of ceramic and has both electrically insulating characteristics and a thermal conductivity of >10 W/mK.

20. The external stator as claimed in claim 15, wherein the electrical insulator is formed by encapsulation at least of the pole core of the stator tooth by injection molding, wherein a potting material used in the injection molding is a thermoplastic or a thermosetting plastic, wherein the thermosetting plastic has in particular a heat conductivity of greater than 1 W/mK.

21. The external stator as claimed in claim 20, wherein the electrical insulator has at least one window-like aperture or a recess with a thin-walled region for receiving at least one heat-conducting element in positively locking fashion, wherein the heat-conducting element is arranged laterally on the pole core of the stator tooth, and has a heat conductivity of greater than 5 W/mK, and is manufactured from boron nitride.

22. The external stator as claimed in claim 21, characterized in that the electrical insulator and the at least one heat-conducting element are placed in before the injection molding process and are jointly encapsulated by injection molding.

23. A rotating-field machine including the external stator as claimed in claim 1.

24. The rotating-field machine as claimed in claim 23, further including a pot-shaped rotor with a cylindrical wall that bears externally situated permanent magnets, wherein a rotor shaft is connected rotationally conjointly to the pot-shaped rotor, extending through a base wall of the pot-shaped rotor.

25. The rotating-field machine as claimed in claim 23, the external stator further including exciter coils, wherein heat generated by the exciter coils is dissipated both in an axial direction and in a radial direction.

26. The rotating-field machine as claimed in claim 23, further including a thermal insulation part between the external stator and an electronic control unit (ECU).

27. The rotating-field machine as claimed in claim 23, further including an electronic control unit (ECU) and a housing surrounding the external stator, wherein the ECU and the housing surrounding the stator are enclosed using a potting compound, and/or the ECU is arranged in a separate housing, and wherein a sensor for detecting movement of a sensor target is arranged in the ECU.

28. The rotating-field machine as claimed in claim 27, wherein the ECU includes power electronics that are arranged to dissipate heat of the ECU to the housing of the rotating-field machine and/or to the housing of the ECU.

29. The rotating-field machine as claimed in claim 23, further including a cooling body arranged radially on an inside of a housing surrounding the external stator, wherein dissipation of heat from the external stator takes place both in an axial direction via the cooling body and also in a radial direction by abutment of the external stator against the housing.

* * * * *